(12) United States Patent
Roycroft et al.

(10) Patent No.: US 6,821,166 B2
(45) Date of Patent: Nov. 23, 2004

(54) POWER TRAIN

(75) Inventors: Terence James Roycroft, Waiuku (NZ); Alan Timothy Gibbs, London (GB)

(73) Assignee: Gibbs Technologies Limited (GB)

( * ) Notice: Subject to any disclaimer, the term of this patent is extended or adjusted under 35 U.S.C. 154(b) by 0 days.

(21) Appl. No.: 10/343,371

(22) PCT Filed: Aug. 23, 2001

(86) PCT No.: PCT/GB01/03786

§ 371 (c)(1),
(2), (4) Date: Apr. 15, 2003

(87) PCT Pub. No.: WO02/16159

PCT Pub. Date: Feb. 28, 2002

(65) Prior Publication Data

US 2003/0171043 A1 Sep. 11, 2003

(51) Int. Cl.[7] .................................................. B60F 3/00
(52) U.S. Cl. ............................. 440/12.51; 440/12.59; 440/12.61
(58) Field of Search .................. 402/12.5, 12.51, 402/12.57, 12.58, 12.59, 12.6, 12.61

(56) References Cited

U.S. PATENT DOCUMENTS

| | | | | |
|---|---|---|---|---|
| 1,174,216 A | * | 3/1916 | Wilkerson | 440/12.51 |
| 3,114,347 A | * | 12/1963 | Trippel | 440/12.59 |
| 3,177,840 A | * | 4/1965 | Reichart | 440/12.58 |
| 3,605,962 A | * | 9/1971 | Maynard | 477/175 |
| 5,752,862 A | | 5/1998 | Mohler et al. | 440/38 |

FOREIGN PATENT DOCUMENTS

| | | |
|---|---|---|
| DE | 1530 577 | 12/1969 |
| DE | 1 530 577 | * 12/1969 |
| DE | 3916200 | 11/1990 |
| DE | 39 16 200 A1 | * 11/1990 |
| JP | 63093607 | 4/1988 |

OTHER PUBLICATIONS

Copy of International Search Report dated Dec. 6, 2001.
Copy of United Kingdom Search Report dated Nov. 10, 2000.
Copy of United Kingdom Search Report dated Mar. 29, 2001.

* cited by examiner

Primary Examiner—Sherman Basinger
(74) Attorney, Agent, or Firm—Young & Basile, P.C.

(57) ABSTRACT

Power train for amphibious vehicle comprises engine aligned with longitudinal vehicle axis, transmission, and power take off mounted between engine and transmission. At least one marine propulsion unit mounted at the rear of the vehicle, is driven by shaft which runs alongside the transmission. Either transmission is offset to axis, and marine propulsion unit is on axis; or transmission is on axis, and the marine propulsion units are offset to axis. The driven road wheels may be the front wheels, the rear wheels, or all four. The engine may be at the front of the vehicle and the transmission at the back. Alternatively, the transmission may drive forward to a differential mounted adjacent to the engine sump, with wheel drive shaft passing through said pump.

44 Claims, 5 Drawing Sheets

POWER TRAIN

BACKGROUND OF THE INVENTION

The present invention relates to a power train suitable for use in an amphibious vehicle capable of travel on land and water, particularly to a power train in which a conventional in-line automotive engine and transmission arrangement is adapted to drive at least some of the wheels and a marine propulsion means of an amphibious vehicle. The invention also relates to an amphibious vehicle having such a power train.

In a known automotive power train arrangement, an engine having a crankshaft is positioned such that the crankshaft is in-line with the longitudinal axis of the vehicle. The engine drives a transmission which is arranged in line with and behind the engine. Often, the transmission has an integral differential which is connected by axle shafts to drive a pair of road wheels of the vehicle. This arrangement is commonly known as a transaxle drive and has been employed in front engine, rear engine and mid engine power train layouts.

The in-line power train, and in particular the transaxle front wheel drive arrangement is currently used by several large car manufacturers in the production of larger private passenger vehicles and is therefore produced in relatively high volumes, which makes the arrangement most procurable for use in an amphibious vehicle. In choosing a power train for a specialized low volume production vehicle, such as an amphibious vehicle, availability is an important factor.

SUMMARY OF THE INVENTION

It is an object of the present invention to provide a power train for an amphibious vehicle, in which a conventional in-line engine and transmission are utilized and adapted. It is a further object of the invention to provide an amphibious vehicle having such a power train.

In accordance with a first aspect of the invention, there is provided a power train for an amphibious vehicle, which power train comprises an engine adapted for mounting in the vehicle such that a crankshaft of the engine is substantially in alignment with a longitudinal axis of the vehicle, a transmission, and a power take off positioned in the drive line between the engine and the transmission, characterized in that the power take off is adapted to drive at least one marine propulsion unit located at the rear of the amphibious vehicle by means of a shaft which runs alongside the transmission.

In a preferred embodiment, a transfer drive is provided between the engine and the transmission, the transfer drive being adapted to transfer drive from the crankshaft of the engine to the transmission and to a drive shaft for the marine propulsion means, the drive shaft for the marine propulsion means being in axial alignment, or substantially so, with the crankshaft of the engine, and the transmission being offset relative to the crankshaft. The transfer drive may comprise a driving sprocket offset arranged for rotation with the crankshaft of the engine and a driven sprocket offset from the crankshaft, the driving and driven sprockets being drivingly interconnected by a toothed belt or chain. The driving sprocket may be mounted to a first shaft which is connected to the crankshaft of the engine, the first shaft being adapted to drive the drive shaft for the marine propulsion unit. The first shaft may be connected to the drive shaft for the marine propulsion unit by a decoupler. In a preferred arrangement, the driven sprocket is arranged to drive a second shaft which provides an input to the transmission. The second shaft may be connected to an input shaft of the transmission by a drive coupling unit such as a fiction clutch or a fluid coupling.

In an alternative preferred embodiment, the transmission is adapted to be mounted such that it is substantially in axial alignment with the axis of the crankshaft with the center line of the at least one marine propulsion unit being located parallel to and offset from the longitudinal axis of the vehicle. In such an arrangement, the power take off may be adapted to drive two marine propulsion units located at the rear of the amphibious vehicle, the respective center lines of the marine propulsion units being located parallel to and offset from the longitudinal axis of the amphibious vehicle on opposite sides thereof. The power take off may be adapted to drive the two marine propulsion units by means of shafts which run along opposite sides of the transmission.

Preferably, the engine and transmission are adapted to be positioned towards the front of the amphibious vehicle and to provide drive to at least the front wheels of the vehicle.

Alternatively, the engine and transmission are adapted to be positioned towards the rear of the vehicle and to provide drive to at least the rear wheels of the vehicle.

In a further alternative embodiment, the engine is adapted to be positioned towards the front of the vehicle and the transmission is adapted to be positioned towards the rear of the vehicle and to provide drive to at least the rear wheels of the vehicle.

Preferably, the transmission is a transaxle unit integral gearbox and differential. Alternatively, the transmission may have an output located to one side thereof and which drives a differential positioned adjacent a sump of the engine.

A further power take off may be provided such that the power train can provide drive to both the front and the rear wheels of the vehicle.

Preferably, the shaft or shafts which run alongside the transmission are adapted to be mounted in alignment with or parallel to the longitudinal axis of the vehicle.

In accordance with a second aspect of the invention, there is provided an amphibious vehicle, characterized in that it comprises a power train in accordance with the first aspect of the invention.

BRIEF DESCRIPTION OF THE DRAWINGS

Several embodiments of the invention will now be described, by way of example only, with reference to the following drawings in which.

DETAILED DESCRIPTION OF THE PREFERRED EMBODIMENT

Figure 1:
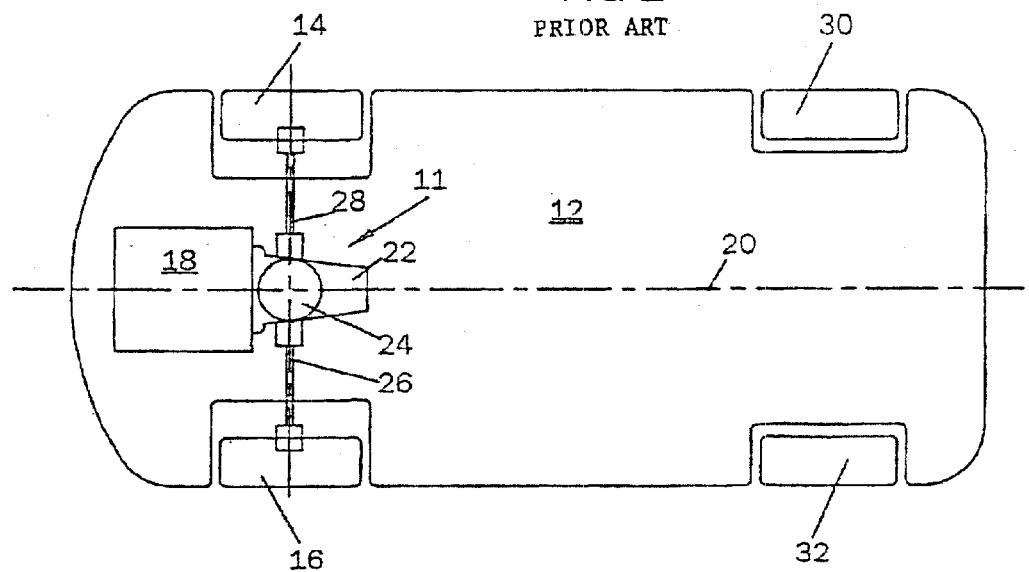
FIG. 1 is a schematic plan view of a view having a conventional power train arrangement.

Common reference numerals are used throughout to denote parts in common between the several embodiments.

Referring firstly to FIG. 1, a conventional in-line power train arrangement is shown driving the front wheels 14,16 of a vehicle 12. An engine is positioned forward of the front wheels 14,16 with the crankshaft (not shown) of the engine 18 in axial alignment with the central axis 20 of the vehicle 12. A transaxle drive unit, indicated generally at 11, comprises a transmission or gearbox 22 mounted in line with the engine 18 and an integral differential 24, positioned at the bottom of the transmission 22. Axle shafts 26, 28 drive the front wheels 14,16 of the vehicle from the differential 24. The rear wheels 30, 32 of the vehicle 12 are not driven.

Figure 2:
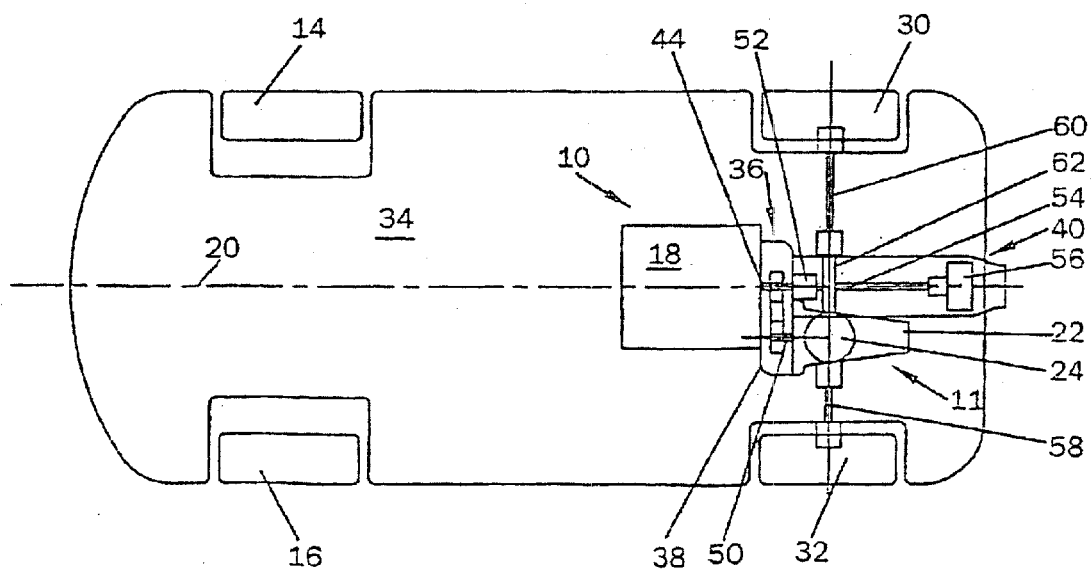
FIG. 2 is a schematic plan view of an amphibious vehicle having a power train in accordance with a first embodiment of the invention.
Figure 3:
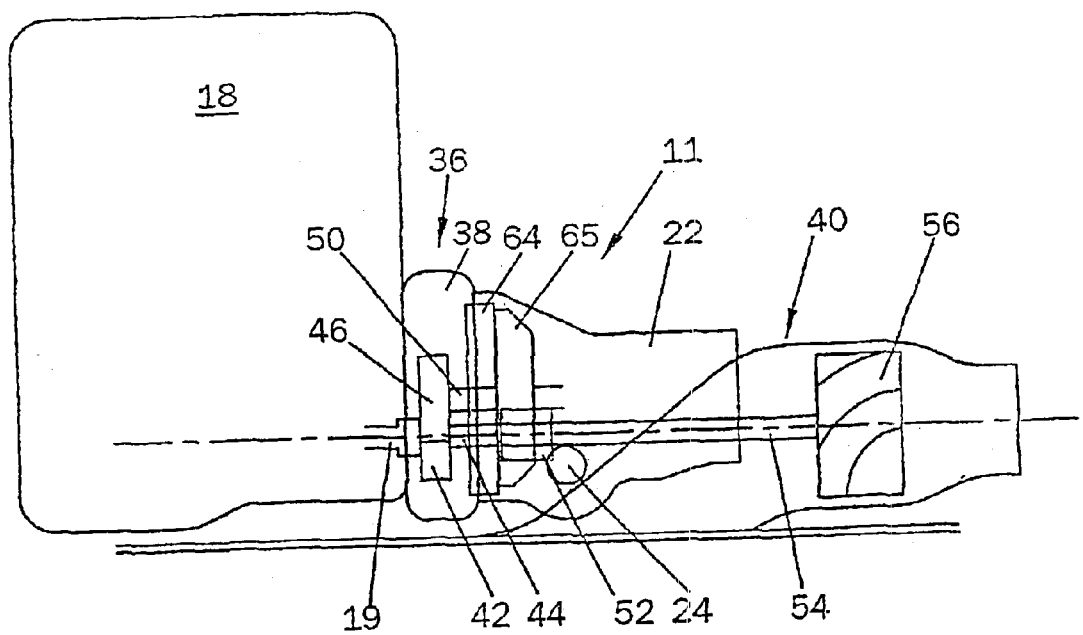
FIG. 3 is a side view, partially in section, of the power train of FIG. 2.
Figure 4:
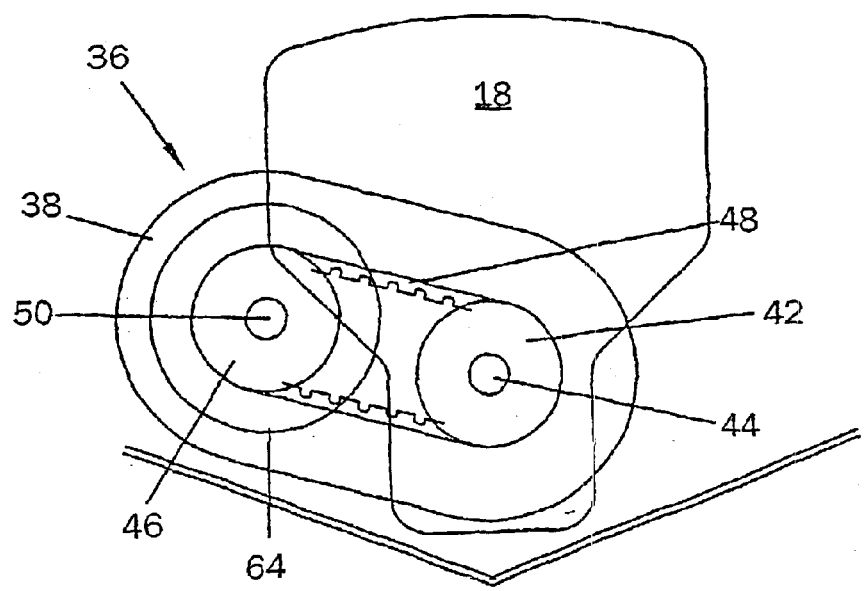
FIG. 4 is a section through a transfer drive of the power train of FIGS. 2 and 3 as viewed looking in the direction of the engine.

A first embodiment of the invention will now be described with reference to FIGS. 2 to 4.

A power train, indicated generally at 10, comprises an engine 18 which is mounted towards the rear of an amphibious vehicle 34, forward of the center line of the rear wheels 30, 32, with the crankshaft 19 (partially shown in FIG. 3) of the engine 18 in axial alignment with the longitudinal axis 20 of the vehicle. A transfer drive, generally indicated at 36 and shown in more detail in FIGS. 3 and 4, is housed in a chaincase 38 mounted to the engine 18. A transaxle drive unit, generally indicated at 11, including a transmission or gearbox 22 and differential 24 is mounted to the chaincase 38. The power train 10 also comprises a marine propulsion unit in the form of a water jet 40. The transaxle drive 11 and the water jet 40 are both driven by the engine 18 through the transfer drive 36.

The transfer drive 36 comprises a driving sprocket 42 mounted on a driving shaft 44, which is connected to the crankshaft 19 of the engine 18. A further sprocket 46 is offset laterally and vertically relative to the shaft 44 and is driven from the driving sprocket 42 by means of a toothed belt or chain 48. The sprocket 46 is mounted on and drives a shaft 50, which provides an input to the transaxle drive unit 11 as will be described below. Alternatively, gears may be used to transfer drive from the driving shaft 44 to the driven shaft 50.

Drive for the water jet 40 16 taken from the driving shaft 44 of the transfer drive 36. The driving shaft 44 is connected to a drive shaft 54 of the water jet by A decoupler 52. The drive shaft 54 of the water jet is substantially in axial alignment with the crankshaft 19 of the engine and so with the longitudinal axis 20 of the vehicle. An impeller 56 is mounted on the shaft 54. Whilst it is preferred that a decoupler 52 be incorporated in the drive line between the engine and the marine propulsion unit to be enable drive to the marine propulsion unit to be selectively disengaged when the vehicle is operating in road mode, this is not essential and the decoupler 52 can omitted if desired.

The transaxle drive unit 11 is driven by the drive shaft 50 via a friction clutch 65 mounted at the front of the transmission 22. The friction clutch 65 is a conventional friction clutch of the type commonly used in automotive vehicles and so need not be described in detail. The clutch 65 is mounted to a flywheel or counter pressure plate 64 which is arranged for rotation with the drive shaft 50. The clutch 65 transfers drive from the flywheel 64 to an input shaft (not shown) of the transmission 22 via a driven plate (not shown) in a conventional manner.

In an alternative embodiment where the transmission 22 comprises an automatic gearbox, the friction clutch 65 can be replaced by a fluid coupling such as a torque converter in a manner well known in the art.

It will be noted that the transaxle drive unit 11 is offset relative to the crankshaft 19 of the engine such that the input shaft (not shown) of the transmission 22 is in axial alignment with the shaft 50. The offset position of the transaxle drive unit 11 ensures that the drive for the water jet can be aligned with the crankshaft of the engine and so with the longitudinal axis of the vehicle. This simplifies the drive arrangement for the single water jet which is preferably positioned centrally at the rear of the vehicle.

The differential 24 of the transaxle unit 11, drives the rear wheels 30,32 via axle shafts 58, 60. The axle shaft 58, which drives the left hand (as viewed) rear wheel 32, is connected directly to the differential. However, because the transaxle drive unit is offset to the left, as viewed, the axle shaft 60, which drives the right hand (as viewed) rear wheel 30, is connected to the differential through a relay shaft 62. The relay shaft 62 passes perpendicular to the drive shaft 54 of the water jet unit 40, and may be located above or below the shaft 54 depending on the particular geometry of the vehicle 34.

Figure 5:
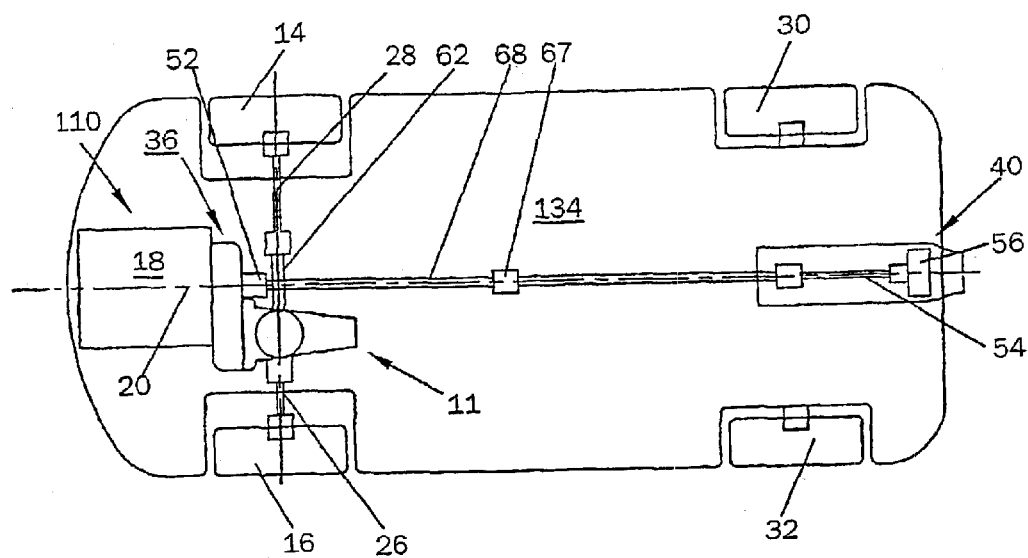
FIG. 5 is a view similar to that of FIG. 2 but showing a second embodiment of a power train in accordance with the invention.

Referring now to FIG. 5, a second embodiment in accordance with the invention will be described.

FIG. 5 shows an amphibious vehicle 134 having a power train 110 which is similar to the power train 10 of the vehicle 34 described above in relation to FIGS. 2 to 4. The main differences being that the engine 18, transfer drive 36 and transaxle drive unit 11 are located towards the front of the vehicle in order to drive the front wheels 14, 16, and in that the optional decoupler 52 is connected to a propeller shaft 68 with centre bearing 67 which drives the rear mounted water jet 40.

The rear wheels 30, 32 of the vehicle 66 are not driven, however, if desired a power take off (not shown) could be provided from the transaxle drive unit 11 to drive a further differential (not shown) for driving the rear wheels 30, 32.

As discussed above, the use of a transfer drive between an in-line engine and a transmission enables the transmission to be offset relative to the axis of the crankshaft, such that drive to a marine propulsion unit can be provided in axial alignment with the longitudinal axis of the vehicle. This has significant advantages in the design layout of an amphibious vehicle while enabling conventional and readily available in-line engine and transmission drive units to be utilized. This arrangement is particularly suited to use with an in-line engine and transaxle power train unit.

Figure 6:
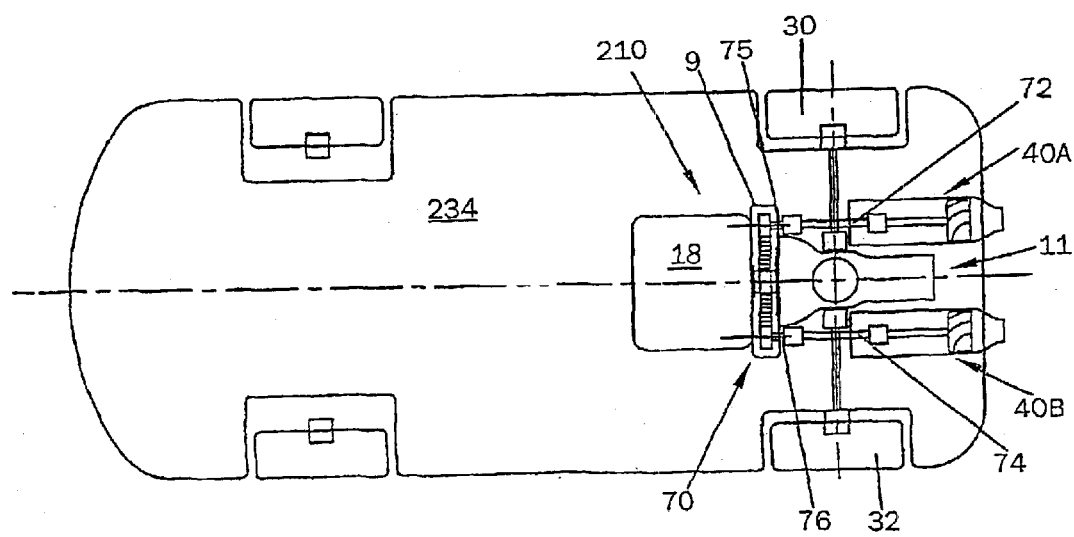
FIG. 6 is a view similar to that of FIG. 2 but showing a third embodiment of a power train in accordance with the invention.

FIG. 6 shows a third embodiment of a power train 210 in accordance with the invention. The power train 210 comprises an engine 18 mounted towards the rear of an amphibious vehicle 234 with the crankshaft (not shown) substantially in-line with the longitudinal axis (not shown) of the vehicle. An in-line transaxle unit 11 is provided behind the engine and drives the rear wheels 30, 32 of the vehicle in a conventional manner.

The power train 210 also has two marine propulsion units 40A, 40B at the rear of the vehicle. The marine propulsion units 40A, 40B are arranged such that their respective center lines are parallel to and offset, on opposite sides, from the longitudinal axis of the vehicle. A sandwich power take off 70 is provided between the engine and the transaxle unit 11 and drives the marine propulsion units via shafts 72, 74 which run along opposite sides of the transaxle unit 11.

The power take off 70 has a pair of output shafts 75, 76 driven by the crankshaft of the engine 18, and is enclosed by a gear case 9. The output shafts 75 and 76 are shown parallel to and on either side of the transaxle 11 and are coupled to the drive shafts 72 and 74 respectively which run rearward and are connected in driveable connection to respective marine propulsion units 40A and 40B. The marine propulsion 40A, 40B may be water jets as shown here or may be screw propellers or any other suitable marine propulsion system.

Figure 7:
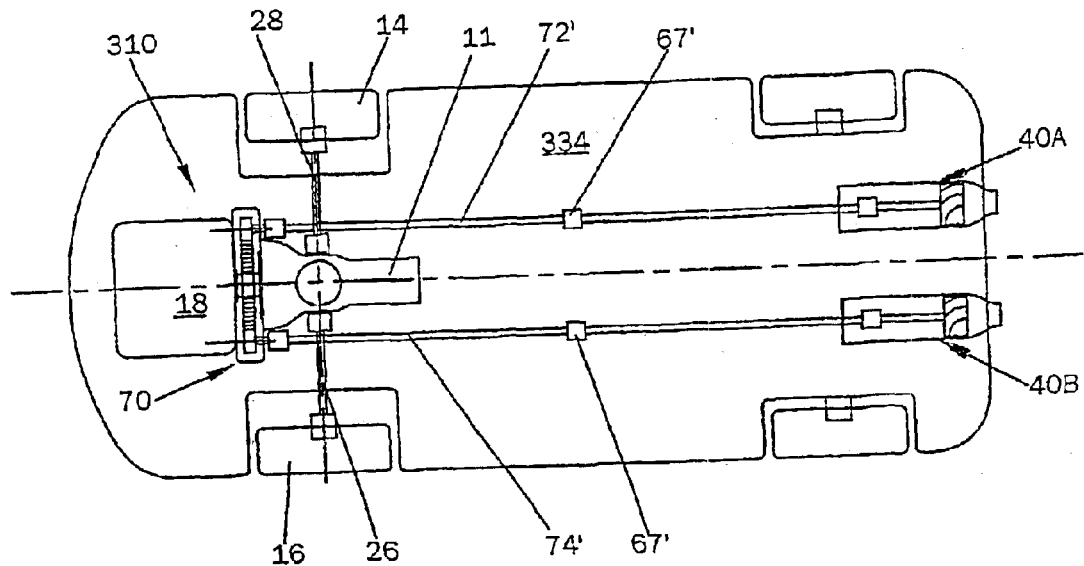
FIG. 7 is a view similar to that of FIG. 2 but showing a fourth embodiment of a power train in accordance with the invention.

A fourth embodiment of a power train 310, in accordance with the invention is shown in FIG. 7. The power train 310 is similar to the power train 210 shown in FIG. 6 except that the engine and transaxle are mounted towards the front of the vehicle334 such that the transaxle unit 11 drives the front wheels 14, 16 of the vehicle. Because the engine and transaxle are mounted towards the front of the vehicle, it is necessary for the sandwich power takeoff 70 to drive the marine propulsion units 40A, 40B through extended drive shafts 72', 74' with center bearings 67' which run along opposite sides of the transaxle 11. The transaxle 11 transmits drive to the front wheels 14, 16 via axle shafts 26 and 28 in conventional automotive manner.

Figure 8:
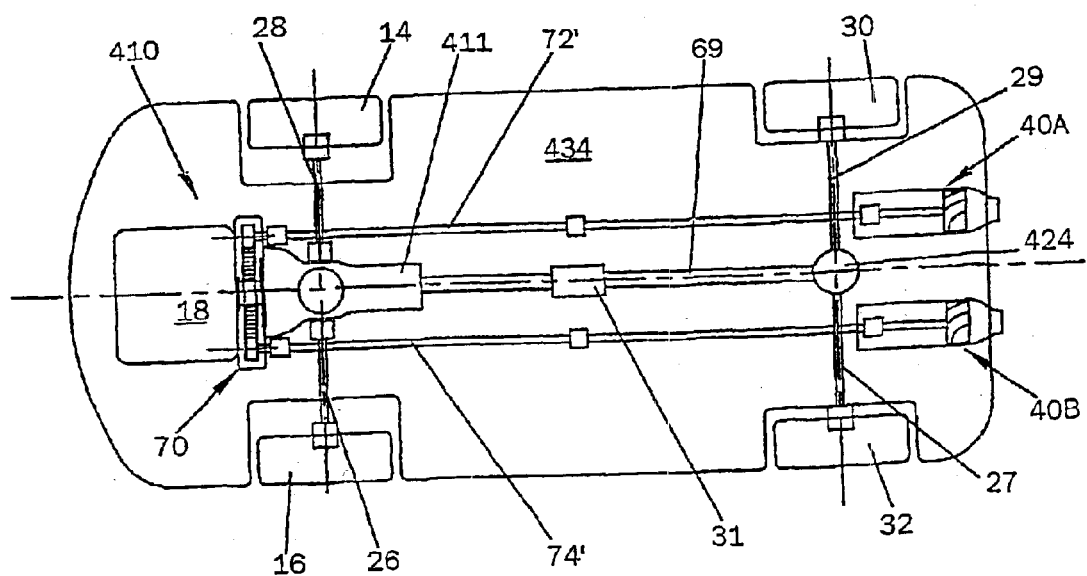
FIG. 8 is a view similar to that of FIG. 2 but showing a fifth embodiment of a power train in accordance with the invention.

A fifth embodiment of a power train 410 is shown in FIG. 8. Power train 410 is similar to power train 310 described above, but includes drive to rear wheels 30, 32 by a power take-off from the rear end of transmission 411, through shaft 69 and optional center differential 31, to rear differential 424 and rear axle drive shafts 27 and 29. A decoupler (not shown) may be included between transmission 411 and shaft 69 to enable drive to the rear wheels to disconnected.

Figure 9:
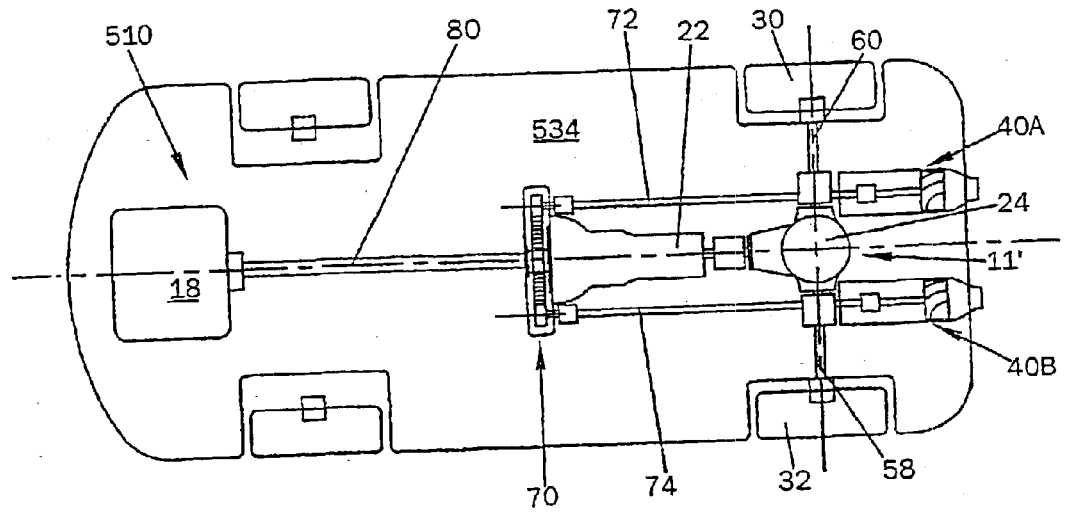
FIG. 9 is a view similar to that of FIG. 2 but showing a sixth embodiment of a power train in accordance with the invention.

A sixth embodiment of a power train 510 is shown in FIG. 9. Power train 510 is similar to the power trains 210 and 310 described above and comprises an in-line engine 18 and transmission 11', with a power take off 70 in the drive line between the engine and the transmission and which drives a pair of marine propulsion units 40A, 40B at the rear of the vehicle 534. The marine propulsion units having respective center lines which are parallel to and offset on opposite sides from the longitudinal axis of the vehicle. In this embodiment, however, the engine is positioned towards the front of the vehicle, while the transmission 11' is located towards the rear of the vehicle to drive the rear wheels. Drive is transmitted from the engine to the transmission by means of a shaft 80 which may be a propeller shaft.

In the embodiment shown, the transmission 11' is a transaxle having an integral differential 24 located in-line and rearwardly of an output end of the gearbox 22. The differential drives the rear wheels of the vehicle through axle shafts 58, 60 in a conventional manner. The transmission could, however, be a transaxle of the type shown in FIGS. 1 to 8 in which the differential is located at the bottom of the gearbox 22.

Figure 10:
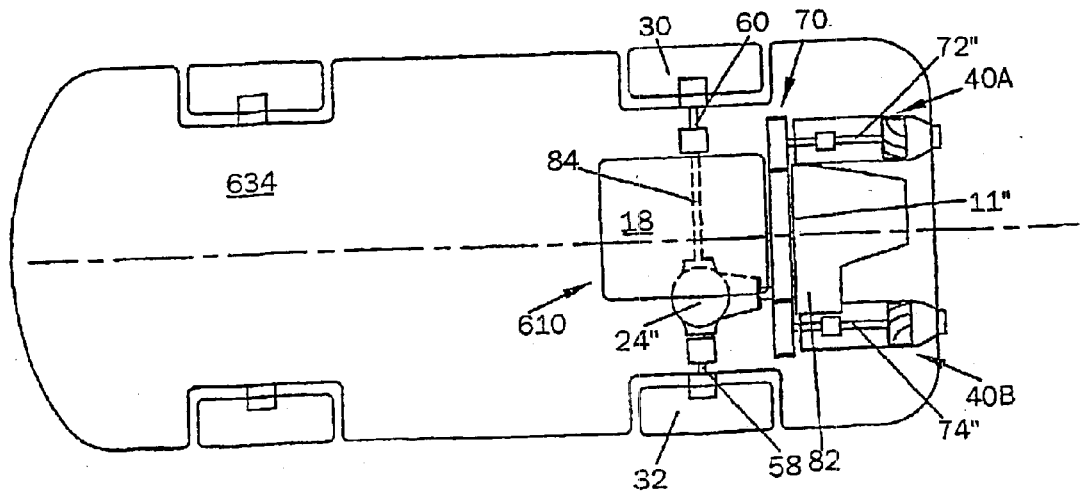
FIG. 10 is a view similar to that of FIG. 2 but showing a seventh embodiment of a power train in accordance with the invention.

A final embodiment of the invention is shown in FIG. 10. A power train 610 comprises an in-line engine 18 and transmission 11'' located towards the rear of an amphibious vehicle 634. A power take off 70 between the engine 18 and transmission 11'' drives a pair of marine propulsion units 40A, 40B by means of drive shafts 72'', 74'' which run along opposite sides of the transmission. The marine propulsion units having respective center lines which are parallel to and offset on opposite sides from the longitudinal axis of the vehicle.

The transmission 11'' has an output 82 which is located to one side of the transmission and which extends forwardly to drive a differential 24'' positioned adjacent to one side of the sump of the engine 18. The differential 24'' drives the right hand rear wheel 30 of the vehicle via a relay shaft 84 and an axle shaft 60. The differential drives the left hand rear wheel 32 directly via a further axle shaft 58 in a conventional manner. The relay shaft 84 may pass along one side of the sump, below the sump or through a tunnel formed in the sump as is convenient to the design of the vehicle.

If required, the engine, power take off and transmission of power train 610 could be positioned towards the front of the vehicle with the differential 24'' driving the front wheels of the vehicle. In this case, the shafts, 72'', 74'' which drive the marine propulsion units would have to be extended in a manner similar to the shafts 72', 74' shown in the FIG. 7 embodiment.

In all of the embodiments described above in relation to FIGS. 6 to 10, rather than having two offset marine propulsion units, the power train may comprise a single water jet at the rear of the vehicle, the center line of the water jet being located parallel to and offset from the center line of the amphibious vehicle.

Whereas the invention has been described in relation to what is presently considered to be the most practical and preferred embodiments, it is to be understood that the invention is not limited to the disclosed arrangements but rather is intended to cover various modifications and equivalent constructions included within the spirit of the invention. For example, the water jet units may be replaced by any other suitable marine propulsion means, such as a marine screw propeller.

What is claimed is:

1. A power train for an amphibious vehicle, which power train comprises: an engine adapted for mounting in the vehicle such that a crankshaft of the engine is substantially in alignment with a longitudinal as of the vehicle, a transmission positioned rearwardly of the engine, and a power take off positioned in the drive line between the engine and the transmission, the power take off being adapted to drive at least one marine propulsion unit located at the rear of the amphibious vehicle by means of a shaft which runs alongside the transmission, wherein a transfer drive is provided between the engine and the transmission, the transfer drive being adapted to transfer drive from the crankshaft of the engine to the transmission and to a drive shaft for the marine propulsion unit, the drive shaft for the marine propulsion unit being substantially in axial alignment with the crankshaft of the engine, and the transmission being offset relative to the crankshaft.

2. A power train as claimed in claim 1, in which the transfer drive comprises a driving sprocket arranged for rotation with the crankshaft of the engine and a driven sprocket offset from the crankshaft, the driving and driven sprockets being drivingly interconnected by a toothed belt or chain.

3. A power train as claimed in claim 2, in which the driving sprocket is mounted to a first shaft which is connected to the crankshaft of the engine, the first shaft being adapted to drive the drive shaft for the marine propulsion unit.

4. A power train as claimed in claim 3, in which the first shaft is connected to the drive shaft for the marine propulsion unit by a decoupler.

5. A power train as claimed in claim 2, in which the driven sprocket is arranged to drive a second shaft which provides an input to the transmission.

6. A power train as claimed in claim 5, in which the second shaft is connected to an input shaft of the transmission by a drive coupling unit such as a friction clutch or a fluid flywheel.

7. A power train as claimed in claim 1, in which the engine and transmission are adapted to be positioned towards the front of the amphibious vehicle and to provide drive to at least the front wheels of the vehicle.

8. An amphibious vehicle, characterized in that the vehicle comprises a power train as claimed in claim 1.

9. A power train for an amphibious vehicle, which power train comprises: an engine adapted for mounting in the vehicle such that a crankshaft of the engine is substantially in alignment with a longitudinal axis of the vehicle, a transmission positioned rearwardly of the engine, and a power take off positioned in the drive line between the engine and the transmission, the power take off being adapted to drive at least one marine propulsion unit located at the rear of the amphibious vehicle by means of a shaft which runs alongside the transmission, in which the engine and transmission are adapted to be positioned towards the rear of the vehicle and to provide drive to at least the rear wheels of the vehicle.

10. A power train as claimed in claim 9, in which a transfer drive is provided between the engine and the transmission, the transfer drive being adapted to transfer drive from the crankshaft of the engine to the transmission and to a drive shaft for a marine propulsion means, the drive shaft for the marine propulsion means being in axial alignment, or substantially so, with the crankshaft of the engine, and the transmission being offset relative to the crankshaft.

11. A power train as claimed in claim 10, in which the transfer drive comprises a driving sprocket arranged for rotation with the crankshaft of the engine and a driven sprocket offset from the crankshaft, the driving and driven sprockets being drivingly interconnected by a toothed belt or chain.

12. A power train as claimed in claim 11, in which the driving sprocket is mounted to a first shaft which is connected to the crankshaft of the engine, the first shaft being adapted to drive the drive shaft for the marine propulsion unit.

13. A power train as claimed in claim 12, in which the first shaft is connected to the drive shaft for the marine propulsion unit by a decoupler.

14. A power train as claimed in claim 11, in which the driven sprocket is arranged to drive a second shaft which provides an input to the transmission.

15. A power train as claimed in claim 14, in which the second shaft is connected to an input shaft of the transmission by a drive coupling unit such as a friction clutch or a fluid flywheel.

16. A power train as claimed in claim 9, in which the transmission is adapted to be mounted such that it is substantially in axial alignment with the axis of the crankshaft, the center line of the at least one marine propulsion unit being located parallel to and offset from the longitudinal axis of the vehicle.

17. A power train as claimed in claim 16, in which the power take off is adapted to drive two marine propulsion units located at the rear of the amphibious vehicle, the center lines of the marine propulsion units being located parallel to and offset from the longitudinal axis of the amphibious vehicle on opposite sides thereof.

18. A power train as claimed in claim 17, in which the power take off is adapted to drive the marine propulsion units by means of shafts which run along opposite sides of the transmission.

19. A power train as claimed in claim 9, in which each said shaft which runs alongside the transmission is adapted to be mounted substantially in alignment with or parallel to the longitudinal axis of the vehicle.

20. An amphibious vehicle, characterized in that the vehicle comprises a power train as claimed in claim 9.

21. A power train for an amphibious vehicle, which power train comprises: an engine adapted for mounting in the vehicle such that a crankshaft of the engine is substantially in alignment with a longitudinal axis of the vehicle, a transmission positioned rearwardly of the engine and a power take off positioned in the drive line between the engine and the transmission, the power take off being adapted to drive at least one marine propulsion unit located at the rear of the amphibious vehicle by means of a shaft which runs alongside the transmission, in which the transmission includes a transaxle unit having an integral gearbox and differential.

22. A power train as claimed in claim 21, in which a transfer drive is provided between the engine and the transmission, the transfer drive being adapted to transfer drive from the crankshaft of the engine to the transmission and to a drive shaft for a marine propulsion means, the drive shaft for the marine propulsion means being in substantial axial alignment with the crankshaft of the engine, and the transmission being offset relative to the crankshaft.

23. A power train as claimed in claim 22, in which the transfer drive comprises a driving sprocket arranged for rotation with the crankshaft of the engine and a driven sprocket offset from the crankshaft, the driving and driven sprockets being drivingly interconnected by a toothed belt or chain.

24. A power train as claimed in claim 23, in which the driving sprocket is mounted to a first shaft which is connected to the crankshaft of the engine, the first shaft being adapted to drive the drive shaft for the marine propulsion unit.

25. A power train as claimed in claim 24, in which the first shaft is connected to the drive shaft for the marine propulsion unit by a decoupler.

26. A power train as claimed in claim 23, in which the driven sprocket is arranged to drive a second shaft which provides an input to the transmission.

27. A power train as claimed 26, in which the second shaft is connected to an input shaft of the transmission by a drive coupling unit such as a friction clutch or a fluid flywheel.

28. A power train as claimed in claim 21, in which the transmission is adapted to be mounted such that it is substantially in axial alignment with the axis of the crankshaft, the center line of the at least one marine propulsion unit being located parallel to and offset from the longitudinal axis of the vehicle.

29. A power train as claimed in claim 28, in which the power take off is adapted to drive two marine propulsion units located at the rear of the amphibious vehicle, the center lines of the marine propulsion units being located parallel to and offset from the longitudinal axis of the amphibious vehicle on opposite sides thereof.

30. A power train as claimed in claim 29, in which the power take off is adapted to drive the marine propulsion units by opposite sides of the transmission.

31. A power train as claimed in claim 21, in which the engine and transmission are adapted to be positioned towards the front of the amphibious vehicle and to provide drive to at least the front wheels of the vehicle.

32. A power train as claimed in claim 21, in which the engine and transmission are adapted to be positioned towards the rear of the vehicle and to provide drive to at least the rear wheels of the vehicle.

33. A power train as claimed in claim 21, in which the engine is adapted to be positioned towards the front of the vehicle and the transmission is adapted to be positioned towards the rear of the vehicle and to provide drive to at least the rear wheels of the vehicle.

34. A power train as claimed in claim 21, in which a further power take off is provided such that the power train can provide drive to both the front and the rear wheels of the vehicle.

35. A power train as claimed in claim 21, in which each said shaft which runs alongside the transmission is adapted to be mounted substantially in alignment with or parallel to the longitudinal axis of the of the vehicle.

36. An amphibious vehicle, characterized in that the vehicle comprises a power train as claimed in claim 21.

37. A power train for an amphibious vehicle, which power train comprises: an engine adapted for mounting in the vehicle such that a crankshaft of the engine is substantially in alignment with a longitudinal axis of the vehicle, a transmission positioned rearwardly of the engine, and a power take off positioned in the drive line between the engine and the transmission, the power takeoff being adapted to drive at least one marine propulsion unit located at the rear of the amphibious vehicle by means of a shaft which runs alongside the transmission, in which the transmission includes an output located to one side thereof, the output being adapted for driving a differential positioned adjacent a sump of the engine.

38. A power train as claimed in claim 37, in which the transmission is adapted to be mounted such that it is substantially in axial alignment with the axis of the crankshaft, the center line of the at least one marine propulsion unit being located parallel to and offset from the longitudinal axis of the vehicle.

39. A power train as claimed in claim 37, in which the engine and transmission are adapted to be positioned towards the rear of the vehicle and to provide drive to at least the rear wheels of the vehicle.

40. A power train as claimed in claim 37, in which each said shaft which runs alongside the transmission is adapted to be mounted substantially in alignment with or parallel to the longitudinal axis of the vehicle.

41. An amphibious vehicle, characterized in that the vehicle comprises a power train as claimed in claim 37.

42. A power train for an amphibious vehicle, which power train comprises an engine adapted for mounting in the vehicle such that a crankshaft of the engine is substantially in alignment with a longitudinal axis of the vehicle, a transmission positioned rearwardly of the engine, and a power take off positioned in the drive line between the engine and the transmission, the power take off being adapted to drive at least one marine propulsion unit located at the rear of the amphibious vehicle by means of a shaft which runs alongside the transmission, in which the engine is adapted for mounting towards the front of the vehicle, and the drive train further includes a differential driven from the transmission and adapted for mounting between the rear wheels of vehicle, the differential being adapted to provide drive to the rear wheels.

43. A power train as claimed in claim 42, in which the transmission is spaced rearwardly from the engine.

44. A power train as claimed in claim 43, in which the differential is spaced rearwardly from the transmission.

* * * * *